United States Patent [19]
Fischer et al.

[11] 3,885,910
[45] May 27, 1975

[54] PROCESS FOR FINISHING FIBROUS MATERIALS WITH CHLORITES AND POLYMERIZABLE COMPOUNDS

[75] Inventors: Klaus Fischer, Kelkheim, Taunus; Otto Deschler, Niederhofheim, Taunus, both of Germany

[73] Assignee: Hoechst Aktiengesellschaft, Frankfurt am Main, Germany

[22] Filed: Dec. 29, 1972

[21] Appl. No.: 319,463

[30] Foreign Application Priority Data
Jan. 3, 1972  Germany.............................. 2200112

[52] U.S. Cl.............. 8/108; 252/187 R; 8/DIG. 18; 8/120; 8/115.6; 8/94.15; 8/94.18; 117/66; 117/152; 117/142; 8/DIG. 7; 8/DIG. 13
[51] Int. Cl................................................ D06l 30/6
[58] Field of Search...................... 8/108.5, DIG. 18; 252/187 R

[56] References Cited
UNITED STATES PATENTS

| | | | |
|---|---|---|---|
| 2,338,268 | 1/1944 | Stossel et al. | 8/108 |
| 2,482,891 | 4/1949 | Aston | 252/187 R |
| 3,111,358 | 11/1963 | Doerr | 8/108 |

OTHER PUBLICATIONS
White, "Chemistry of Chlorites", page 782–792, July 1942 Industrial and Engineering Chemistry 8/108.5.

*Primary Examiner*—Donald Levy
*Attorney, Agent, or Firm*—Connolly and Hutz

[57] ABSTRACT

A process for bleaching and finishing fibrous materials with a mixture containing salts of chlorous acid, polymerizable olefinically unsaturated compounds, small amounts of water and addition products of alkylene oxides on organic compounds which carry 1 to 10 active hydrogen atoms.

11 Claims, No Drawings

PROCESS FOR FINISHING FIBROUS MATERIALS WITH CHLORITES AND POLYMERIZABLE COMPOUNDS

The present invention relates to a process for finishing fibrous materials with chlorites and polymerizable compounds.

It is known to polymerize monomer organic compounds having unsaturated carbon-carbon bonds on textile substrates, cellulose and others or to produce a graft copolymer with the substrate over a direct chemical bond. These polymerizations and graft copolymerizations are preferably carried out in the presence of hydrogen peroxide, oxydation-reduction systems, for example, iron-(II)-ions and hydrogen peroxide, furthermore, ozone, ozone/oxygen mixtures or energized rays, for exmaple, electron or γ-rays, as initiator for the chain formation. (cf. H. A. Krässig, V. Stanett, "Graft Co-Polymerization to Cellulose and its Derivatives," Advances Polymer Sci. Vol. 4, p. 111–156 (1965) and J. C. Arthur, "Graft Polymerization onto Polysaccharides," Advances Macromolecular Chem., Vol. 2, p. 1–86 (1970)).

In order to be able to intitate the polymerization or graft-copolymerization oxygen must be excluded as far as possible, which is achieved by introducing the substrate into a nitrogen or carbon dioxide atmosphere or a high vacuum and polymerizing it therein. From the economical point of view this operating method requires additional expenditure as compared with the finishing of substrates usually carried out in practice, i.e., in an air or steam atmosphere. Moreover, the substances used as polymerization initators all exerce a detrimental effect on the substrates; for example, exmaple, hydrogen peroxide heavily impairs the stability of fabrics during a longer time of treatment, or redox systems, for example, iron-(II)-ions or cer-(IV)-ions cause alterations in shade, or radiation initiation leads to looses of stability and alterations in shade. For this reason the most desirable initiators or initiator systems are those which have no or only a slight effect on the physical properties or alterations of shade of the material to be finished. It is also important to use a suitable solvent for the polymerization or graft-copolymerization reactions in order to dissolve the monomers to be used. There are generally used alcohols, for example, methanol and ethanol, which are, however, slightly volatile. In many cases, the polymerizable monomer itself is used as solvent, i.e., the substrate is polymerized in an excess of the monomer. This process, however, has various drawbacks which are, for example, the toxicity of the polymerizable substrates, the complicated introduction and taking out of the substrate and the elimination of the excess of monomer. For most of the monomers which are hydrophobic, water alone is not suitable as reaction medium and therefore, aqueous emulsions are often used.

In this case the monomer often is not homogeneously distributed on the substrate which renders the finishing effects difficult to be reproduced.

The different monomers yield determined advantageous finishing effects, for example, the improved resistance to microorganisms of cellulose fibers by polymerized acrylonitrile or the improved adhesion of viscose cord to caoutchouc by styrene (cf. J. of Polymer Sci. 53 (1961); 87–92), but these finishing effects alone have not been sufficient so far to carry out the complicated polymerization reactions on substrates in the absence of oxygen or air, accompanied by the drawbacks of known initiator systems and the expenditure for radiations and choice of solvent, on an industrial scale. It was therefore desirable to achieve reproducible finishing effects by using a suitable initiator system and working according to a simpler operational method no longer under an oxygen free atmosphere in the application and polymerization reaction.

Now, it was found that the above-mentioned difficulties and drawbacks occuring in the polymerization and graft-copolymerization of compounds having carbon-carbon double bonds on organic materials can be avoided when using as initiator and solvent system salts of the chlorous acid, especially alkali metal, alkaline earth metal or colourless heavy metal salts, preferably alkali metal chlorites, in the presence of relatively great amounts of organic compounds containing alkylene oxy groups.

The present invention provides a process for the continuous or discontinuous finishing, and simultaneous bleaching, of fibrous materials with polymerizable compounds, which process comprises subjecting the fibrous material to the action of a liquid or pasty mixture which contains salts of the chlorous acid as oxidating agent, polymerizable olefinically unsaturated compounds, at least small amounts, however, less than 80 percent by weight, of water and at least 15, preferably, at least 20, and especially, more than 40 percent by weight addition products of alkylene oxides on organic compounds carrying 1 to 10 reactive hydrogen atoms which addition products contain at least an alkylene oxy radical of the formula

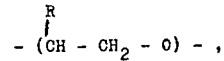

wherein R is hydrogen, a methyl or ethyl group, linked over an oxygen or nitrogen atom.

The organic compounds contained in the bleaching agent mixture in accordance with the invention which carry at least one alkylene oxy group, may be polyalkylene glycols or reaction products of alkylene oxide containing 2, 3 or 4 carbon atoms in the alkylene radical with organic compounds containing one to ten groups having active hydrogen atoms, or the esters of the sulfuric, phosphoric or carboxylic acid of these addition products. The groups having active hydrogen atoms may be of the formula —OH, —COOH, —NH 2 or <NH. Mixtures of these alkylene oxide addition products with one another or mixtures of these addition products with polyalkylene glycols may also be used.

The products containing alkylene oxy groups are, generally, water-soluble or hydrophilic compounds. If the products considered are solid or wax-like, they are made liquid by using them advantageously together with the above products of liquid consistency. The polyalkylene glycols to be used in accordance with the invention are all products derived from ethylene oxide, propylene oxide and/or butylene oxide having a content of at least 2 to about 20,000, preferably from 3 to 15, alkylene oxy radicals. Suitable are not only the compounds having pure chains, for example, diethylene glycol, triethylene glycol, and higher polyethylene glycols, dipropylene glycol, tripropylene glycol and higher polypropylene glycols, butylene glycol, dibutylene glycol and higher polybutylene glycols and mixtures of these polyalkylene glycols having pure chains, but also copolymers and graft- and block polymers of the ethylene oxide, the propylene oxide and the butylene oxide.

The alkylene oxide addition products may be derived, for example, from mono- or polyvalent alcohols, carboxylic acids, oxy acids, amines, urethanes, carboxylic acid amides or other compounds having an NH— or NH$_2$— group or from phenols as basic molecules.

In the simplest case of alkylene oxide addition products on the basis of monovalent or bivalent organic compounds these addition products are of the general formula I

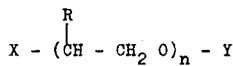
(I)

wherein
R is hydrogen, a methyl or ethyl group,
X is one of the radicals

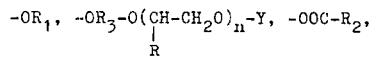

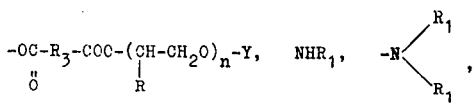

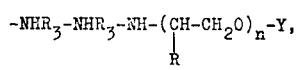

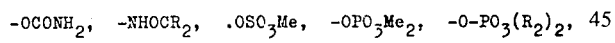

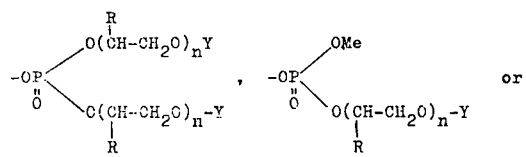

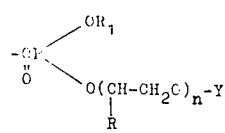

Y is hydrogen or one of the radicals —R$_1$, —OCR$_2$, —CONH$_2$, —SO$_3$Me or —PO$_3$Me$_2$, R$_1$ is an alkyl or perfluoroalkyl radical having from 1 to 25 carbon atoms, preferably from 8 to 18, the phenyl or naphthyl radical, a mono-, di- or trialkylphenyl or -naphthyl radical having altogether from 3 to 20 carbon atoms in the alkyl radicals, a cycloalkyl radical having from 4 to 6 carbon atoms or an alkyl-triazinyl radical having from 3 to 20 carbon atoms in the alkyl radical, R$_2$ is an alkyl radical having from 2 to 24 carbon atoms, the phenyl or naphthyl radical, alkylphenyl or -naphthyl radical having from 3 to 20 alkyl carbon atoms or a cycloalkyl radical having from 4 to 6 carbon atoms, R$_3$ is an alkyl radical having from 3 to 10 carbon atoms, the phenylene radical, a hydroxyphenyl radical or the diphenylene or diphenyl ether radical, Me is hydrogen, an alkali metal ion, the ammonium ion or, proportionately, an alkaline earth ion and n is a number from 1 to 50, preferably from 4 to 30.

For the process of the invention, there may equally be used alkylene oxide addition products which are derived from organic compounds containing from 3 to 10 groups with active hydrogen atoms. Those polyfunctional compounds are, above all, polyhydroxy compounds, such as glycerol, pentaerythritol, trimethylol propane, hexantriol, butantriol, sorbitol, mannitol, glucose, saccharose and reaction products of these polyhydroxy compounds, for example, carbamates, sulfates, sulfonates and phosphates.

Such suitable polyfunctional compounds to be subjected to oxalkylation are polycarboxylic acids, for example, terephthalic acid, isophthalic acid, o-phthalic acid, trimellitic acid, pyromellitic acid and benzene hexacarboxylic acid as well as polyfunctional compounds which may contain hydroxy and carboxy groups or amino groups at the same time.

As alkylene oxide addition products there may be considered for the process of the invention above all the inexpensive technically easily available products of this kind, for example, addition reaction products of ethylene oxide and/or propylene oxide and/or butylene oxide with monovalent, primary, secondary or tertiary alcohols, with phenol, naphthol or alkyl phenol or -naphthols, with cyclohexanol or carboxylic acids, especially the easily accessible natural fatty acids or carboxylic acid amides.

Among the compounds mentioned above there are chosen for the process of the invention those which have at least one alkylene oxy group in the molecule, especially the substances or substance mixtures which are liquid under normal conditions because they can easily be applied together with the salts of the chlorous acid and the polymerizable monomers on the material to be finished or contacted with it or also directly serve as bleaching and finishing medium. Compounds containing alkylene oxy groups which are of higher viscosity or in pasty form may also be used according to known methods, for example, by slop-padding or by doctor-knife application at room temperature, but in this case it is advantageous to use them together with compounds containing alkylene oxy groups of lower viscosity. Compounds containing alkylene oxy groups of higher viscosity or of wax-like form, for example, polyalkylene glycols of a molecular weight above 1,000 may also be used. They may also be applied to the substrate to be bleached and finished together with the bleaching agent and the polymerizable monomer at elevated temperature in molten state and, optionally, the bleaching and finishing process may be effected at that elevated temperature as far as this is possible with regard to the volatility of the polymerizable monomer used.

When using in this invention the usual methods of impregnation, slop-padding or doctoring care must be taken that the compounds containing alkylene oxy groups used do not have a foaming effect which would disturb the application. In many cases and when using compounds containing alkylene oxy groups having a great tendency to foaming the bleaching agent may also directly be applied to the substrate to be finished as foam, which also leads to interesting bleaching and finishing effects. For the usual application with poor foam development polyalkylene glycols, mixtures thereof with one another or mixtures thereof with ethylene glycol, propylene glycol and butylene glycol are preferably used.

The salts of the chlorous acid which are generally in powder form are normally not dissolved in the compounds containing alkylene oxy groups. For the preparation of the bleaching and finishing mixtures according to the invention, these salts therefore are mixed with the compounds containing alkylene oxy groups as aqueous solutions or emulsions. The amount of water required in these mixtures may, however, be slight, for it was surprising that according to the process of the invention, other than with known bleaching methods, textiles, for example, could very well be bleached in the presence of minimal amounts of water. In the process of the invention just as slight amounts of water are enough as are required for dissolving, pasting or emulsifying the salt-like bleaching agents and, optionally, the other additives also used, for example, activators, corrosion-protective agents or polymerization inhibitors. Minimal portions of water, for example, from 0.5 to 10 percent by weight, are already sufficient to achieve good bleaching and finishing effects in the final mixture of bleaching agent. Generally, the water content of the mixture of chlorite, polymerizable monomer and compound containing alkylene oxy groups according to the invention is adjusted to less then 80 percent by weight, especially less than 50 percent by weight and, preferably, less than 20 percent by weight. With increasing portions of water in the bleaching agent mixture the bleaching effect decreases so that already with a mixing ratio of water to compounds containing alkylene oxy groups of 3:2 a much poorer bleaching and finishing effect must be stated. If working under these conditions with a relatively great portion of water above 50 percent by weight is desired, chemical activation and the use of elevated temperature usual in the known bleaching methods have mostly to be resorted to. But the process of the invention just offers the advantage that the use of chemical activating agents can be dispensed with. On the other hand, however, great portions of water make the finishing effect caused by the monomer now disappear.

The bleaching agent mixture of the invention may have a content of compounds containing alkylene oxy groups within the range of from about 10 to about 95 percent by weight; mostly, their concentration in the bleaching agent mixture is from 20 to 75 percent by weight, especially above 40 percent by weight.

The amount of polymerizable, olefinically unsaturated compounds required for the process of the invention depends, above all, on the finishing effect desired and may, therefore, vary within wide limits. Generally, these monomers are contained in the bleaching agent mixture in an amount of from about 0.2 to about 60 percent by weight, but it ranges mostly from 5 to 40 percent by weight.

As polymerizable, olefinically unsaturated monomers for the operational method of the invention the unsuitable compounds are those which lead to a fair chlorodioxide formation with salts of the chlorous acid in aqueous phase or to alterations in shade in the presence of chlorites. For the reason, for example, chlorides and anhydrides of polymerizable carboxylic acids, N-methylol-compounds of polymerizable amides, polymerizable chloromethyl compounds, glycidyl methacrylate and maleinic amide are not suitable for the process of the invention.

The polymerizable compounds of the invention may contain one or several olefinic double bonds which should be present at room temperature in solid or liquid form.

The monomers of the invention are, for example, derivatives of the acrylic acid or methacrylic acid, for example, the acrylic and methacrylic acid ester of mono- or polyvalent alcohols, including perfluorinated alcohols and polyalkylene glycols; salts of the acrylic or methacrylic acid, acrylo- or methacrylo-nitrile, 2-cyanoethyl acrylate, acrylo or methacrylo amide and N-($C_1$ to $C_4$)-alkylacryl amides, 1,3,5-triacryloylhexahydro-s-triazine, acryl-guanamine, methylene-bis-acryl amide, derivatives of the itaconic, crotonic, maleinic and fumaric acid, the esters and salts thereof, furthermore, vinyl compounds, for example, vinyl ester having from 1 to 18 carbon atoms in the carboxylic acid radical, mononuclear vinyl aromates, for example, styrene, alkyl- or alkoxy-substituted styrenes, styrenesulfonic acid sodium, vinyl heterocylene, for example, 2-vinyl-pyridine or N-vinyl-pyrrolidone, vinylsilane, vinyl ether, for example, alkyl vinyl ether, the alkyl group thereof having from 1 to 18 carbon atoms, divinyl compounds, for example, divinyl benzene, salts of the vinylsulfonic acid or vinylphosphonic acid, dienes, for example isoprene, allyl compounds, for example, allyl esters of the acetoacetic acid, phthalic acid or phosphoric acid and triallyl cyanurate.

The following publications have summarized grafts and polymerizations of the monomers of the invention, for example: J. C. Arthur, "Graft Polymerization onto Polysaccharides," Advances Macromolecular Chem. 2 (1970), p. 52—71; G. Bouillon "Modifizierungsreaktionen an polyamidfaeden," part II "Pfropfcopolymerisationen mit Acrylsaeure, Acrylsaeure derivaten und weiteren ungesaettigten organischen Derivaten," Faserforschung und Textiltechnik 22 (1971), 1, 34—41 and A. A. Konkin "Methoden zur Modifizierung von Polyacrylnitrilfaserstoff," Faserforschung und Textiltechnik 18 (1967), 7, 345–347.

Polymerizable perfluoro compounds are described, for example, in German Offenlegungsschrift NO. 1,900,234 and vinylphosphonic acid derivatives in German Auslegeschrift No. 1,229,491.

According to the process of the invention, it is also possible to use such polymerizable compounds alone or together with the said monomers which contain chromophore groups and are, thus dyestuffs. These compounds are described, for example, in K. Uno et al., "Syntheses of Polymerization and Polypropylene Fibers," J. of Polymer Sci. A-1, 2311–2322 (1967).

The polymerizable monomers can be reacted as homogeneous compounds or as a mixture of different monomers.

The process of the invention has the surprising advantage that monomers having a marked hydrophobic character, for example, styrene, perfluoroacrylic acid ester or vinyltriethoxy silane, can be used too. The finishing effects caused by the hydrophobic monomers, for example, a water-repellent effect in the case of styrene, surprisingly are not adversely affected by the novel process and the compounds containing alkoxy groups and the initiators used therein. There can, rather, be maintained, after elimination of the hydrophilic solvent and the monomer possibly unreacted by simple rinsing operations with water, an excellent water-repellent effect, for example, on fabrics.

The bleaching and finishing process according to the invention may be carried out by treating the material to be finished i.e., bringing it into close contact with the compound containing alkylene oxy groups, the mixture containing the salts of the chlorous acid and the polymerizable monomers in the form of a solution, paste, foam or emulsion containing at least slight portions of water during such a period of action until the bleaching and finishing effect desired is obtained. The amount of salts of the chlorous acid which act as bleaching agent and as initiator for the polymerization at the same time, may vary within wide limits. The concentration of the chlorite in the mixture depends, inter alia, on the degree of the shade alteration and the effect of bleaching and finishing desired. The salts of the chlorous acid are generally used in a concentration of from about 0.05 to about 20 percent by weight, preferably of from 0.5 to 5 percent by weight. It is especially advantageous that no measures have to be taken to exclude the oxygen in the polymerization reaction.

According to a modified embodiment of the process of the invention, the mixture of chlorites, monomer and compounds containing alkylene oxygroups which is, for example, in the form of a solution, paste or emulsion containing small amounts of water can also be stored separately from the fibrous material optionally above room temperature, which material is then treated with the mixture.

Suitable initiators or bleaching agents for the process of the invention are, above all, alkali metal, alkaline earth metal or undyed heavy metal salts of the chlorous acid and, for economical reasons, especially, sodium or potassium chlorite. These salts are used as textile bleaching agents on an industrial scale. (cf. A. Agster "Neuere Erkenntnisse auf dem Gebiet der Bleicherci und ihre Bedeutung fuer die Betriebspraxis," Zeitschr. f. d. ges. Textilindustrie 70 (1968), p. 616; O. Deschler "Die Chloritbleiche unter HT-Bedingungen" Melliand Textilberichte 49 (1968), 1301). They have the advantages that they are undyed and act on organic substrates, for example, fibers and flat-surface textile structures, cellulose, wood and paper with care, i.e., the stability decreases less in the presence of chlorites than with other initiators, for example, hydrogen peroxide.

The combined bleaching and finishing process of the invention is effected already at and below room temperature, but the use of elevated temperatures reduces the time necessary for bleaching and finishing. As compared with conventional bleaching processes which require elevated temperatures and chemical activators the reduced bleaching time under heat supply according to the invention is especially advantageous. Very high temperatures, however, are not necessary but only slightly elevated temperatures, for example for about 50° to about 60°C, and a relatively short time of treatment are sufficient to obtain an excellent bleaching and finishing effect. The use of relatively low temperatures is also advantageous when it is intended to combine the bleaching and finishing process with an enzymatic desizing process. It is known that the activity of enzymes is heavily reduced at temperatures above 60°C so that it is difficult to combine the disizing process with the conventional bleaching processes.

According to the invention, favourable bleaching and finishing effects can be obtained within a wide range of temperature or at relatively low temperatures and short bleaching times which has the advantage that the material to be finished is only slightly damaged by the initiator. The combined bleaching and finishing process can also be accelerated by the action of energised rays which is, however, not absolutely necessary.

Heat energy may be supplied in the bleaching process of the invention either by heating or steaming the material to be finished in advance and then treating it with the mixture of the invention or by heating, or steaming the material during the action of the mixture or subjecting it after a certain time of action of the mixture to a short heat treatment at low temperatures.

The compounds containing alkylene oxy groups used have the advantage that they are little volatile and thus render it more difficult for the more volatile monomers to escape. As in the process of the invention higher viscous mixtures of initiator and solvent, for example, mixtures of chlorites and compounds containing alkylene oxy groups, are used, in contradistinction to the application of monomers from aliphatic alcohols or water which are easy to evaporate, the volatility of the monomers is generally reduced. It is also a decisive advantage over the known processes in which monomers and initiators are used in aqueous or alcoholic solution that homogeneous bleaching and finishing effects are obtained.

It is a decisive prerequisite of the process of the invention in which bleaching and finishing is combined, that the bleaching conditions determined according to the invention, due to the novel combination of chlorites and compounds containing hydrophilic alkylene oxy groups allow to work, generally, at temperatures, for example, below 90°C, at which most of the monomers just do not escape to a larger extent inspite of their volatility. Thus, by adjusting time and temperature in adequate manner, optimal degrees of whiteness and finishing effects can be obtained during the finishing process without a greater loss of volatile monomers. As compared with known bleaching processes it has even been stated that in the absence of monomers either the temperature or the time could be lowered or reduced without increasing the amount of oxydating agent. Furthermore, other than in known bleaching processes with chlorites, fair brightenings of the organic material and, at the same time, a finishing effect can be obtained by the monomer.

To prepare the combined bleaching and finishing mixture according to the invention the individual components may be mixed with one another in any desired order. The salts of the chlorous acid are advantageously used in the form of an aqueous solution. The process of the invention is above all used for bleaching and finishing textile material. The mixtures may contain besides the salts of the chlorous acid, polymerizable monomers and compounds containing alkylene oxy groups and water also optical brighteners, dyestuffs, pigments, complex forming agents, stabilizers, inhibitors of the polymerization, thickeners, defoaming agents, protective agents, for example, fiber protective agents and fiber swelling agents and, optionally, activators for the chlorite or other auxiliaries.

The monomer and oxydating agent can also be applied to or incorporated into the material to be finished with slight amounts of water and the compounds containing alkylene oxy groups together with an inert organic solvent as aliphatic and aromatic hydrocarbons and mixtures of hydrocarbons, for example, paraffin oil, gasoline, mineral oils, chlorinated hydrocarbons, for example, perchloroethylene, tetrachloromethane, methylene chloride, trichloroethylene, 1,1,1-trichloroethane, fluorinated hydrocarbons, for example, dichlorodifluoroethane, dimethyl formamide, dimethyl sulfoxide, silicone oil and others. The bleaching and finishing mixture may be applied to the textile material in any desired manner, for example, by padding, spraying doctoring, slop-padding, according to the exhaustion method or by applying it locally, optionally together with thickeners. The monomer, oxydating agent or initiator and solvent may be applied together or separately, for example, by applying the monomer separately from the initiator-solvent system. Therefore, the material to which the mixture of monomer, initiator and solvent has been applied is allowed to dwell continuously or discontinuously to carry out the bleaching and finishing operation. For this purpose, known apparatuses may be used, for example, open-width bleaching machines, J-box, vessel, apparatuses analogous to jet-dyeing apparatuses, batching devices or, also, apparatuses for bleaching in rope form and dyeing apparatuses. According to a corresponding operation method, the mixture of monomer, initiator and solvent may also be applied to other, not textile organic substrates to be finished.

A characteristic feature of the bleaching and finishing mixture of the invention is that the liquor stability for impregnation steps is sufficient, i.e., there is no polymerization in the impregnation bath at room temperature as it often happens with the initiation by peroxides in alkaline solution. Only the presence of the substrate allows, according to the invention, the polymerization to take place upon storage and, if necessary, at elevated temperature.

Generally, the material is impregnated with the bleaching and finishing mixture, squeezed and subjected without dryring to temperatures within the range of from about 0° to 200°C, especially 15° to 90°C. Then, the material is rinsed with water or washed. Though, generally, it offers no advantages it is, on principle, also possible in the process of the invention to adjust the pH of the bleaching and finishing agent mixture to 7 and below until the limit of the chlorine dioxide development is reached and to use it for the impregnation of the textiles. To avoid difficulties it is better to maintain the pH value at 10 to 11 normally obtained when commercial chlorite is dissolved in water.

The material treated with the mixture of monomer, initiator, solvent and water may also be heated for a short while at the beginning, during or after storage above the dwelling temperature. It may also be pre- and aftertreated by irradiation for a short while with energised rays at room temperature. The process of the invention offers the advantage that the material is not necessarily in the excess bleaching and finishing liquor. It is generally sufficient, and even advantageous in many cases that the material to be finished is only moistened or impregnated with the bleaching and finishing agent mixture. When working in such a manner, bleaching and finishing agent mixture and, thus, residual water, initiator and monomer can be saved. Morever, it is no more necessary to heat the liquors which required energy and time when using the excess bleaching and finishing liquors.

Further advantages of the process of the invention are that thin, delicate textile material, for example, lace, tulle, textured synthetic fibers, knitted fabric, knitted underwears and others can carefully be bleached and finished without strong mechanical strain, that the material is well moistened and that the hydrophilic organic compounds containing alkylene oxy groups of the invention considerably facilitate the impurities and peelings as well as the unreacted portion of monomers to be washed out of the textile material. All these advantages show that the process of the invention is superior to the conventional bleaching methods on the one hand and to the conventional finishing processes with polymerizable monomers on the other hand.

Heating of the material, if intended, can be effected in any manner, for example, by hot air, infra-red rays or with over-heated steam. In order to avoid losses of monomer and organic compounds containing alkylene oxy groups the impregnated material can be protected, for example, covered with a sheet. The bleaching and finishing process of the invention may also be carried out in such a manner that the material to be treated, for example, cloth, straw or suspended wood-pulp or cellulose, is passed through a heated mixture of monomer, initiator, solvent and water which has been pre-heated for some time; the bleaching and finishing process is carried out, optionally, without longer dwelling times during the passage of the material through the mixture. The bleaching and finishing agent mixture can be recycled which allows to eliminate solid constituents of the material on which a mechanical action is exerted by the bleaching and finishing agent mixture in movement.

This operational method may also be effected discontinuously. In a possible, modified operational method, only a part of the bleaching and finishing agent mixture is heated separately to an elevated temperature, this part than serving as activator for the total bleaching and finishing agent mixture.

Suitable fibrous materials for being subjected to a combined bleaching and finishing according to the process of the invention are, without limitation thereto, for example: natural fibers, cotton, linen, jute, sisal fiber, spun viscose, copper rayon, cellulose acetate fibers, such as triacetate or 2½ acetate or other chemically modified cellulose fibers, alginate fibers, furthermore, animal fibers, such as wool and hair, synthetic fibers, for example, those of linear polyesters, polyamides, polycarbonates, polyacrylonitrile, polyolefins, polyvinyl alcohol, polyacetals, polyurethanes, polytetrafluoroethylene and the copolymers thereof or mixtures of natural and synthetic fibers and, moreover, fiber fleeces, paper, feathers and human hair. Suitable material to be treated may also be pre-irradiated, dyed or finished material.

The textile material to be bleached can be in the form of flocks, threads moist by spinning or obtained by melt spinning, yarn, twist, woven fabric, knitted fabric, fleece, felt, laminated material, pile material and others.

In the same manner as textiles, other fibrous substrates of organic nature, for example leather, paper, straw, wood or wood-pulp may be cleared, or bleached and finished with the bleaching and finishing agent mixture of the invention.

The process of the invention is applied with special advantage for bleaching and finishing paper. The bleaching and finishing agent mixture may, in this case, be applied on the surface, for example, by brushing up. After an adequate dwelling period excellent brightening andn finishing effects are obtained.

The combined bleaching and finishing process of the invention may also be carried out after or prior to a conventional bleaching or finishing process.

Finally, it is also possible to use, in the process of the invention, the salts of the chlorous acid together with other oxydating agents, for example, hydrogen peroxide, inorganic or organic peroxides, ozone, organic substances splitting off chlorine, chlordioxide or hypochlorites and the activators necessary for activating the other oxydating agents, stabilizers and corrosion-protective agents as well as oxydation reduction systems.

To evaluate the bleaching effects of the Examples given hereinafter, the photometer "Elrepho" of Messrs. C. Zeiss, Oberkochen, was used. Remission values in the Examples have been measured with the filter 461 m$\mu$ if not mentioned otherwise. The white standard used was barium sulphate.

The following Examples illustrate the invention, the parts and percentages with the exception of the remission values, are by weight, unless stated otherwise.

EXAMPLE 1

Samples of a desized unbleached cotton fabric (remission: 69.6 percent, weight/m$^2$: about 200 g) were impregnated with liquids of the following composition:

I. 5 Parts of a 30 percent aqueous sodium chlorite solution
   95 Parts of water
II. 5 Parts of a 30 percent aqueous sodium chlorite solution
   90 Parts of polyethylene glycol of a medium molecular weight of 200
   5 Parts of styrene
III 5 Parts of a 30 percent aqueous sodium chlorite solution
   75 Parts of polyethylene glycol of a medium molecular weight of 200
   20 Parts of styrene
IV. 5 Parts of a 30 percent aqueous sodium chlorite solution
   65 Parts of polyethylene glycol of a medium molecular weight of 200
   30 Parts of styrene
V. 5 Parts of a 30 percent aqueous sodium chlorite solution
   15 Parts of polyethylene glycol of a medium molecular weight of 200
   50 Parts of styrene
VI. 5 Parts of a 30 percent aqueous sodium chlorite solution
   35 Parts of polyethylene glycol of a medium molecular weight of 1000
   35 Parts by ethylene glycol
   25 Parts of styrene
VII. 5 Parts of a 30 percent aqueous sodium chlorite solution
   30 Parts of an addition reaction product of 10 mols of ethylene oxide with 1 mol of nonyl phenol
   10 Parts of styrene
   55 Parts of water
VIII. 5 Parts of a 30 percent aqueous sodium chlorite solution
   40 Parts of styrene
   55 Parts of an addition reaction product of 10 mols of ethylene oxide with 1 mol of nonyl phenol
IX. 5 Parts of a 30 percent aqueous sodium chlorite solution
   40 Parts of styrene
   55 Parts of an addition reaction product of 10 mols of ethylene oxide with 1 mol of triisobutyl phenol
X. 5 Parts of a 30 percent aqueous sodium chlorite solution
   30 Parts of styrene
   15 Parts of a reaction product of 1 mol of stearyl alcohol with 5 mols of ethylene oxide
   15 Parts of a reaction product of 1 mol of isotridecanol with 6 mols of ethylene oxide
   35 Parts of paraffin oil DAB 7
XI. 5 Parts of a 30 percent aqueous sodium chlorite solution
   30 Parts of styrene
   65 Parts of an addition reaction product of 10 mols of ethylene oxide with 1 mol of coconut oil alcohol
XII. 5 Parts of a 30 percent aqueous sodium chlorite solution
   30 Parts of styrene
   65 Parts of a reaction product of a propylene glycol of a medium molecular weight of 1750 with 10 mols of ethylene glycol
XIII. 5 Parts of a 30 percent aqueous sodium chlorite solution
   30 Parts of styrene
   65 Parts of dibutyl glycol
XIV. 5 Parts of a 30 percent aqueous sodium chlorite solution
   30 Parts of styrene
   65 Parts of a reaction product of 1 mol of lauryl alcohol with 4 mols of ethylene oxide
XV. 5 Parts of a 30 percent aqueous sodium chlorite solution
   30 Parts of styrene
   65 Parts of a copolymer of ethylene oxide and propylene oxide 1:1 etherified with butyl alcohol.

The liquids had a pH of from 10 to 11, the squeezing effect was about 55–65 percent. The impregnated fabric samples were packed in sheets in smoothly rolled-up state and stored at 70°C for 2 hours. After storage, the fabric samples were rinsed twice with warm and cold water, dried and subjected to a remission measure.

The following remission values had been evaluated:

| | |
|---|---|
| I (comparison without monomer and initiator) | 71.6 % |
| II | 81.2 % |
| III | 81.6 % |
| IV | 80.6 % |
| V | 80.8 % |
| VI | 80.5 % |
| VII | 75.8 % |
| VIII | 80.0 % |
| IX | 80.3 % |
| X | 84.0 % |
| XI | 78.6 % |
| XII | 80.8 % |
| XIII | 76.4 % |
| XIV | 77.8 % |
| XV | 80.7 % |

The finishing in accordance with the invention showed, in comparison with the treatment effected under I an improved bleaching effect, and, depending on the monomers used, a water-repellent effect.

EXAMPLE 2

Samples of a desized, unbleached cotton fabric (remission: 69.9 percent; weight/m$^2$ : about 200 g) were impregnated with liquids of the following composition:

I. 5 Parts of a 30 percent aqueous sodium chlorite solution
   2 Parts of an activator as described in Example C of German Auslegeschrift No. 1,168,859
   93 Parts of water II. 5 Parts of a 30 percent aqueous sodium chlorite solution
    30 Parts of butandiol methacrylate
    65 Parts of a polyethylene glycol of a medium molecular weight of 400

III. 5 Parts of a 30 percent aqueous sodium chlorite solution
     20 Parts of trimethylolpropan-trimethacrylate
     75 Parts of a polyethylene glycol of a medium molecular weight of 600

IV. 5 Parts of a 30 percent aqueous sodium chlorite solution
    20 Parts of triethylene glycol-dimethacrylate
    75 Parts of a polyethylene glycol of a medium molecular weight of 400

V. 3 Parts of a 30 percent aqueous sodium chlorite solution
   20 Parts of butylacrylate
   77 Parts of a polyethylene glycol of a medium molecular weight of 400

VI. 3 Parts of a 30 percent aqueous sodium chlorite solution
    20 Parts of acrylamide
    77 Parts of a polyethylene glycol of a medium molecular weight of 400

VII. 4.5 Parts of a 30 percent aqueous sodium chlorite solution
     15 Parts of octadecane
     80.5 Parts of a reaction product of 1 mol of isotridecanol with 8 mols of ethylene oxide The squeezing effect was about 70 percent. The impregnated fabric samples I–VII were stored at 65°C for 2 hours while packed in a sheet. After rinsing and drying the following remission values have been evaluated:

| | |
|---|---|
| I | 81.6 |
| II | 84.8 |
| III | 83.5 |
| IV | 82.1 |
| V | 83.3 |
| VI | 82.4 |
| VII | 83.6 |

The finishing effects additionally obtained had the following characteristics:

Finishings according to II, III and IV led to a handle stiffening stable to high-duty detergents. The fabrics bleached and finished according to the invention can, thus, be used as stiffening inserts, for example, for collars. Treatments with the liquid V and VII lead to smoothening effects stable to high-duty detergents.

EXAMPLE 3

The efficiency of the process of the invention was also stated on different substrates as is shown in the following tests:

I. Samples of an unbleached knitted fabric of polyester fibers were impregnated with liquids having the following composition:
   a. 5 Parts of a 30 percent sodium chlorite solution
      20 Parts of vinyl triethoxy silane
      75 Parts of a reaction product of 1 mol of isotridecanol with 8 mols of ethylene oxide and
   b. 20 Parts of vinyl triethoxy silane
      80 Parts of a reaction product of 1 mol of isotridecanol with 8 mols of ethylene oxide.

The material impregnated was stored at 80°C for 2 hours while packed in a sheet. Then, it was rinsed with cold and warm water and dried.

II. A crude, unbleached sawed knitted fleece of cellulose was impregnated with a liquid of the following composition:
    5 Parts of a 30 percent aqueous sodium chlorite solution
    65 Parts of a polyethylene glycol of a medium molecular weight of 600
    10 Parts of triethylene glycol dimethacrylate
    20 Parts of styrene The liquor pick-up was about 180 percent. The impregnated sawn knitted fleece was stored at 75°C for 90 minutes while packed in a sheet. Then, it was rinsed with an aqueous-alcoholic solution and dried.

The technological examination yielded the following results:

| | | Remission value | Finishing effect |
|---|---|---|---|
| I. | PES untreated | 80.3 % | rapid wetting with water drops |
| a) | Process according to the invention | 82.7 % | fairly delayed wetting with water drops |
| b) | Comparison without oxydating agent | 80.9 % | in comparison with untreated material slightly reduced wetting with water drops |
| II. | Sawn knitted fleece untreated | 60.9 % | |
| | Process according to the invention | 80.4 % | Solidification effect: Fibers are more solidly anchored in the fleece fabric than in the material untreated. |

EXAMPLE 4

Samples of an unbleached cotton fabric were impregnated with mixtures of the following composition:
a. 1 Part of sodium chlorite
  5 Parts of perfluoroalkyl ethyl acrylate (technical grade mixture of telomers having from 6 to 10 carbon atoms in the perfluoroalkyl radical)
  5 Parts of styrene
  37 Parts of a polyethylene glycol of a medium molecular weight of 400
  35 Parts of a sodiumtridecyl polyglycolether sulfate
  17 Parts of water
b. 1 Part of sodium chlorite
  5 Parts of perfluoroalkyl ethyl acrylate (technical grade mixture of telomers having from 6 to 10 carbon atoms in the perfluoroalkyl radical)
  4 Parts of vinyl toluene
  37 Parts of a polyethylene glycol of a medium molecular weight of 400
  35 Parts of a sodium tridecyl polyglycol ether sulfate
  18 Parts of water The absorption of the mixtures by the material was about 120 percent. The fabrics were covered in rolled-up state with sheet and stored at 80°C for 90 minutes. After rinsing with warm and cold water it was dried. The material so finished showed an excellent bleaching effect and has, also, a very good oil-repellent effect. In the case of (a) the remission evaluated was 81.7 percent (untreated material: 67.2 percent) and the oil-repellent value was 120 and in the case of (b) the remission was 79.8 percent and the oil-repellent value 90. The oil-repellent effect was determined according to Grajek and Peterson, Textile Research Journal 32 (1962), page 323. The value of 120 corresponds herein to a composition expressed in percentage of the mixture of paraffin oil (DAB7) and n-heptan of 30 to 70 percent; the value of 90 of a mixture of 60 percent of paraffin oil (DAB7) and 40 percent of n-heptan.

EXAMPLE 5

Samples of a desized, unbleached cotton fabric (remission: 67.3 percent, weight/m² : about 200 g) were impregnated with liquids of the following composition:
I. 3 Parts of a 30 percent aqueous sodium chlorite solution
  97 Parts of water
II. 3 Parts of a 30 percent aqueous sodium chlorite solution
  19 Parts of polyethylene glycol of a medium molecular weight of 400
  1 Part of styrene
  77 Parts of water.

The pH values of the liquids were within the range of from 9 to 9.5, the squeezing effect was about 55–65 percent. The impregnated fabric samples were stored while packed in sheets in smoothly rolled-up state and were stored at 90°C for 2 hours. After storage, the fabric samples were rinsed with a warm and cold mixture of water and ethanol, dried and subjected to a remission measure.

The following remission values were measured:

| | |
|---|---|
| I. (comparison without monomer and initiator solvent | 73.2 % |
| II. | 77.1 % |

EXAMPLE 6

A sample of a desized, unbleached cotton fabric (remission: 68.4 percent, weight/m² : 120 g) was impregnated with a liquid of the following composition:
  4.5 Parts of a 30 percent aqueous sodium chlorite solution
  70.5 Parts of methyl glycol
  25.0 Parts of a compound of the formula $$C_7F_{15}CH_2OCOCH=CH_2$$

The pH of the bleaching liquid was 11, the squeezing effect was about 80 percent. The impregnated fabric was packed in a sheet in smoothly rolled-up state and stored at 80°C for 2 hours. After storage, the fabric was rinsed twice with warm and cold water, dried and subjected to a remission measure. The remission value measured was 85.2 percent. The fabric had oil- and dirt-repellent properties.

We claim:

1. A process for bleaching and finishing fibrous materials with salts of chlorous acid and polymerizable monomers, which comprises applying to the fibrous materials a composition consisting essentially of a salt of chlorous acid as polymerization initiator and bleaching agent, a polymerizable olefinically unsaturated compound, 0.5 up to 80 percent by weight of water and at least 15 percent by weight of a polyoxyalkylene condensate of an organic compound having 1 to 10 active hydrogen atoms which condensate contains at least one alkylene oxy radical of the formula $$-(\overset{R}{\underset{|}{C}}H - CH_2 - O) -$$

wherein R is hydrogen or the methyl or ethyl group, which radical is linked through an oxygen or nitrogen atom to the organic compound having the active hydrogens.

2. A process as claimed in claim 1, wherein the condensate of alkylene oxides and monovalent or bivalant organic compounds are used having the general formula I $$X - (\overset{R}{\underset{|}{C}}H - CH_2 O)_n - Y \quad (I)$$

wherein
R is hydrogen, a methyl or ethyl group,
X is one of the radicals $$-OR_1, \quad -OR_3-O(\underset{\underset{R}{|}}{C}H-CH_2O)_n-Y, \quad -OOC-R_2,$$

$$-O\underset{\underset{O}{\|}}{C}-R_3-COO-(\underset{\underset{R}{|}}{C}H-CH_2O)_n-Y, \quad NHR_1, \quad -N\overset{R_1}{\underset{R_1}{\diagdown}},$$

$$-NHR_3-NHR_3-NH-(\underset{\underset{R}{|}}{C}H-CH_2O)_n-Y,$$

$$-OCONH_2, \quad -NHOCR_2, \quad -OSO_3Me, \quad -OPO_3Me_2, \quad -O-PO_3(R_2)_2,$$

—Continued

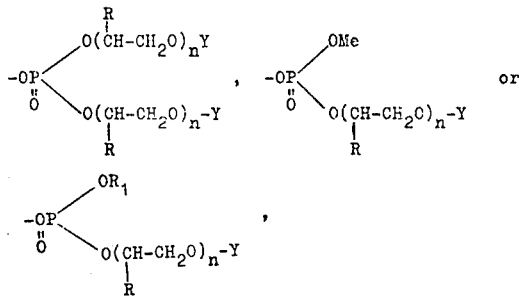

Y is hydrogen or one of the radicals —R₁, —OCR₂, —CONH₂, —SO₃Me or —PO₃Me₂,

R₁ is an alkyl or perfluoroalkyl radical having from 1 to 25 carbon atoms, preferably from 8 to 18, the phenyl or naphthyl radical, a mono-, di- or trialkylphenyl or -naphthyl radical having altogether from 3 to 20 carbon atoms in the alkyl radicals, a cycloalkyl radical having from 4 to 6 carbon atoms or an alkyl-triazinyl radical having from 3 to 20 carbon atoms in the alkyl radicals, R₂ is an alkyl radical having from 2 to 24 carbon atoms, the phenyl or naphthyl radical, alkylphenyl or -naphthly radical having from 3 to 20 alkyl carbon atoms or a cycloalkyl radical having from 4 to 6 carbon atoms, R₃ is an alkyl radical having from 3 to 10 carbon atoms, the phenylene radical, a hydroxyphenyl radical or the diphenylene or diphenyl ether radical, Me is hydrgoen, an alkali metal ion, the ammonium ion or, proportionately, an alkaline earth ion and $n$ is a number from 1 to 50

3. A process as claimed in claim 1, wherein the bleaching and finishing mixture contains 20 to 75 percent by weight of the condensate of alkylene oxides on organic compounds.

4. A process as claimed in claim 1, wherein the bleaching and finishing mixture contains 0.2 to 60 percent by weight of the olefinically unsaturated compounds.

5. A process as claimed in claim 1, wherein the portion of water of the bleaching and finishing mixture is adjusted to less than 50 percent by weight.

6. A process as claimed in claim 1, wherein the bleaching and finishing operation is accelerated by the action of heat onto the fibrous materials before, during or after the application of the bleaching and finishing mixture.

7. A process as claimed in claim 1, wherein esters of the sulfuric, phosphoric or carboxylic acid of the condensate of alkylene oxides are used.

8. A process as claimed in claim 1, wherein the alkali metal or alkaline earth metal salts of the chlorous acid are present in the bleaching mixture in a concentration of from about 0.05 to about 20 percent by weight.

9. A process as claimed in claim 1, wherein the condensate of alkylene oxides on organic compounds carrying 1 to 10 active hydrogen atoms which are liquid at room temperature, are used.

10. A process as claimed in claim 1, wherein the bleaching and finishing mixture is applied to the fibrous material in the form of a foam.

11. A process as claimed in claim 1, wherein the bleaching and finishing mixture additionally contains an inert organic solvent.

* * * * *